United States Patent Office 3,332,605
Patented July 25, 1967

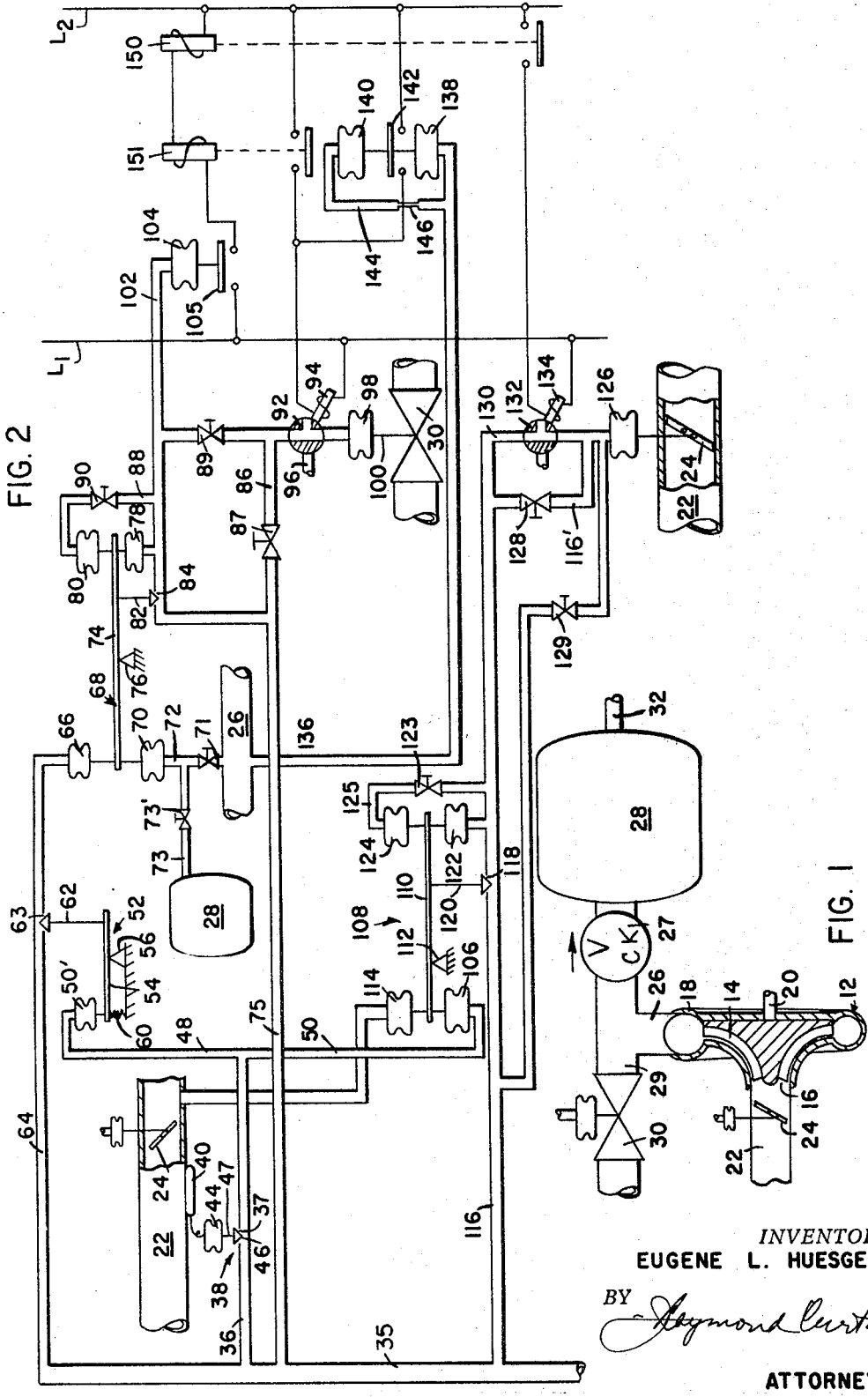
July 25, 1967 E. L. HUESGEN 3,332,605
METHOD OF AND APPARATUS FOR CONTROLLING THE
OPERATION OF GAS COMPRESSION APPARATUS
Filed July 26, 1965
INVENTOR.
EUGENE L. HUESGEN.
BY Raymond Curtin
ATTORNEY.

3,332,605
METHOD OF AND APPARATUS FOR CONTROLLING THE OPERATION OF GAS COMPRESSION APPARATUS
Eugene L. Huesgen, Jeannette, Pa., assignor to Carrier Corporation, Syracuse, N.Y., a corporation of Delaware
Filed July 26, 1965, Ser. No. 474,860
8 Claims. (Cl. 230—22)

This invention relates broadly to the control of the operation of gas compression apparatus. More particularly, this invention relates to a control arrangement for use with gas compression apparatus operating either as a base load machine or an intermittent load machine.

In gas compression equipment such as an air compression plant employing a number of air compressors, wherein ambient air is compressed and delivered to a reservoir, for use at a variable rate, there are two general types of operation involved. The first type of operation is called base load operation and the compressor is controlled so as to deliver an output substantially consistent with a demand variable within predetermined limits. In many cases, the demand will exceed the upper limit which the machine operating on base load conditions is capable of satisfying. Under these circumstances, it is usual practice to provide a second air compressor designed to operate when the first or base load compressor is unable to satisfy the over-all demand. Thus, the second machine operates on an intermittent basis, coming on line for the purpose of supplementing the output of the first compressor until the particular system demand is satisfied.

The control systems employed by each of the machines are different for it is usually intended that the base load machine operate near its surge point under the varying gas temperature and pressure relationship encountered throughout its operating range. The machine operating on an intermittent basis is primarily concerned with satisfying a particular demand and works to that purpose, going off line when the combined output of the two machines satisfies that demand.

The chief object of this invention is the provision of a control arrangement that may be utilized with a machine of the kind described operating on either a base load condition or operating on an intermittent basis.

An additional object of the invention is the provision of an improved control system of the kind described in which there is provided means sensing the temperature and pressure of the air flowing to the compressor and utilizing this relationship to regulate operation of the machine.

A still further object of the invention is the provision of an improved control system including means responsive to a relationship between the temperature of the air or gas supplied to the compressor in relation to the pressure developed by the compressor downstream thereof and utilizing this relationship to control regulation of the machine.

An additional object of the invention is the provision of a control system including a mechanism for regulating operation of valve means controlling the flow of air to the compressor and valve means for venting air from the discharge side of the compressor under prescribed operating conditions. In attaining this object there is provided a mechanism for operating the valves described in a predetermined sequence so as to avoid operation of the compressor in the surge or unstable range associated with the machine.

Other objects and features of the invention will be apparent upon a consideration of the ensuing specification and drawing in which:

FIGURE 1 is a schematic diagram representative of a gas compressor of the kind to which the control system, forming the subject of this invention, may be applied; and FIGURE 2 is a schematic diagram of the control system forming the subject of this invention.

Referring more particularly to the drawing, there is shown in FIGURE 1 an air compressor 12 for the purpose of providing compressed air to a storage vessel or reservoir for use with pneumatic machinery or similar applications where compressed air is utilized as an energy source. It will be appreciated there are many installations requiring compressed air in such large quantities that it is necessary to supply an air compression plant utilizing a plurality of air compressors such as is illustrated in FIGURE 1 operating either as a base load machine or an intermittent machine as described above. The air compressor 12 includes impeller 14 arranged within a casing member. The inlet 16 to the casing communicates with the suction line 22. Air is induced to flow into the compressor through line 22 by the impeller 14 operating under the influence of a motor (not shown). The construction of the impeller and its arrangement within the casing associated therewith is such that air compressed by the impeller is discharged into volute 18 communicating with a discharge conduit 26. Air flowing into the impeller via conduit 22 is regulated by the operation of an inlet valve member 24 shown as a suction damper.

From the discharge conduit 26, air flows through check valve 27 to a reservoir or storage tank 28 where the air is stored under pressure. Connected to discharge conduit 26 is a branch conduit 29 having communication with the atmosphere. Flow of air through the branch conduit 29 is controlled by the action of a dump valve 30. The reservoir 28 communicates with a distribution system (not shown) through a conduit 32 connected to the reservoir. Thus, the air that is collected under pressure in the reservoir 28 is available via conduit 32 to one or more facilities requiring compressed air for the purposes described above.

The control system serving as the subject of this invention is utilized with equipment of the kind described above regardless of whether the equipment is being used to satisfy a base load requirement or an intermittent requirement. The control system acts to regulate the operation of the system in response to the density of the air being handled by the machine and also operates in response to a relationship between the temperature of the air entering the compressor and the pressure developed by the compressor as it operates. It is desirable that the equipment operate, throughout its design range, as close to its surge point as possible and that a relationship be maintained between the density of the gas and the pressure developed in order to achieve operating economy under those circumstances where the compressor is driven by an electrical motor as will be explained more fully hereinafter. To this end, there is provided a control system as illustrated in FIGURE 2.

The embodiment of the invention chosen for description herein utilizes a pneumatic system having a source of supply air of approximately 20 p.s.i. The source of air is employed to operate certain elements forming a part of the control mechanism which in turn regulates the operation of valve 24, controlling flow of air to the compressor and the dump valve 30 regulating the venting of the compressor discharge to the atmosphere in a prescribed manner. To this end, there is provided a main air supply conduit 35 having a first supply branch 36. Disposed in supply branch 36 is a control assembly 38 regulating air flow through bleed orifice 37 in the supply pipe 36. The control 38 acts responsive to changes in the temperature of the air flowing within conduit 22 upstream of the valve 24. A bulb 40 senses the temperature of the air flowing in conduit 22 and is part of a thermal responsive fill system incorporating a bellows 44 and a capillary tube 42 providing communication between the bulb 40 and the bellows 44. Secured to the bellows 44 is a valve assembly, including valve element 46 and rod 47 connected to bellows 44, which moves to enlarge or restrict the effective area of the opening or orifice 37 so as to bleed varying amounts of air from conduit 36 to change the pressure in the conduit 36 downstream of the conduit. Located downstream of the described bleed orifice control are additional branch conduits 48 and 50, which communicate with control elements regulating the operation of valves 24 and 30, respectively.

Branch conduit 48 communicates with a bellows member 50' forming a part of a totalizer relay 52. As will be apparent hereinafter, the totalizer relay 52 is employed for the purpose of receiving a signal indicating an inlet air temperature and transmitting it to a second totalizer for comparison with a signal indicating discharge pressure for the purpose of providing a resultant signal to be supplied to mechanism controlling the dump valve 30. Opposing the action of the bellows 50' is a spring member 60. The purpose of the spring is to offset or nullify a signal in the branch 48 within the range of 3–13 p.s.i.; thus, bellows 50' is effective only under circumstances where the air pressure in branch 48 exceeds 13 p.s.i. The totalizer relay 52 includes a beam 54 pivoted about fulcrum 56. At the end of the lever, opposite the end connected to bellows 50' is a valve member 62 controlling a bleed orifice 63 in conduit 64 connected to the source of supply air in conduit 35 in parallel with conduit 36.

It will be apparent the totalizer relay acts to vary the pressure in conduit 64 and in bellows 66 communicating therewith. Bellows 66 is part of a system 68 also designated as a totalizer relay for comparing pressure downstream of the compressor with inlet temperature. Relay 68 includes a beam 74 supported on a fulcrum 76. Opposing force exerted by bellows 66 to one end of the beam 74 is a force represented by bellows 70 communicating selectively with the line 72 connected to the discharge line 26 of the air compressor through valve 71 and line 73 connected to receiver 28. Flow in line 73 is controlled by valve 73'. At the opposite end of beam 74 there is provided a bellows 78 communicating with a branch supply conduit 75 connected in parallel with conduits 36 and 64 to the source of supply air flowing in conduit 35. Bellows 78 has acting opposite thereto a force represented by bellows 80 communicating likewise with line 75 through line 88. Thus, the force applied to the right side of beam 74 is substantially balanced. Disposed between fulcrum 76 and the end of beam 74, subject to the action of bellows members 78 and 80, is a valve member 82 controlling flow through a bleed orifice 84 disposed in conduit 75. It will thus be appreciated that valve member 82 will restrict bleed orifice 84 in accordance with a resultant force exerted on beam 74. Air pressure in conduit 75 is applied directly to a bellows 98 having an actuator 100 connected to dump valve 30. The parts are so designed that in the absence of air pressure within bellows 98, valve 30 assumes a wide-open position. In addition, there is provided a three-way valve 92 disposed between bellows 98 and the valve 82 regulating the bleed orifice 84. Three-way valve 92 is controlled by a solenoid having a coil 94 serving as a part of the electrical control to be later described. Three-way valve 92 is arranged so that it will communicate with vent line 96 upon energization of coil 94. Communicating with conduit 75 is a line 102 connected to a bellows 104 in turn connected to control switch 105 serving as part of the electrical control. Line 86 is connected to spaced points of conduit 75 so as to, in effect, bypass or shunt the valve 82. Manually operated valve 87 controls the flow of air in line 86. Manually operated control valve 89 controls the flow of air in conduit 75 and manually controlled valve 90 controls the flow of air in line 88. The purpose of the arrangement including conduit 86 will be more fully explained hereinafter.

Referring again to FIGURE 2, it will be noted that branch conduit 50 is provided in parallel with branch conduit 48. Branch conduit 50 communicates with a bellows 106 exerting a force on a totalizer relay 108 including a beam 110 supported on a fulcrum 112. Exerting a pressure opposite that exerted by the bellows 106, is a bellows member 114 communicating with the pressure at the inlet to the air compressor. Totalizer relay 108 is provided for the purpose of comparing the inlet air temperature and the inlet pressure and to provide a signal relative thereto to control the mechanism regulating operation of inlet valve 24. To this end, supply conduit 116, communicating with supply main 35, includes a bleed orifice 118 controlled by a valve member 120 connected to the beam 110. At the end of the beam 110 adjacent the connection of valve 120 are bellows members 122, 124 reflecting pressure in supply conduit 116 in a manner similar to that described in connection with the bellows members 78, 80. Supply conduit 116 communicates directly with bellows 126 regulating operation of the valve member 24. Flow of air in conduit 116' is controlled by manually operated valve 128. Connected in parallel with valve 128 is a line 130 including a three-way valve 132 similar to valve 92. Valve 132 is controlled by solenoid coil 134 in a manner to be more particularly described hereinafter.

An additional feature of the invention involves an arrangement for detecting and preventing surge in the machine equipped with the control forming the subject of this invention. To this end there is provided line 136 an arrangement sensing discharge pressure present in conduit 26. Line 136 communicates with a bellows system including bellows 138 and bellows 140. The bellows 138 and 140 are connected to opposite sides of a switch arm 142 having contacts arranged to close in response to a predetermined pressure difference between bellows 140 and bellows 138. Line 144 connects the two bellows members and has provided therein a restriction 146. With the arrangement shown, pulsations, due to rapidly increasing and decreasing discharge pressures, are sensed by bellows 138 in such a manner that the switch is moved to a closed position in response to a rate of change in discharge pressure, a condition indicating surge. Switch 142 closes a circuit to solenoid coil 94 causing three-way valve 92 to move to a position venting the air pressure in bellows 98 and causing dump valve 30 to assume an open position and thus relieve the relatively high pressure in the discharge conduit 26 so that continuity of flow downstream of the compressor discharge will ensue.

Another feature of the invention is provided by the switch 105 and the circuitry associated therewith. As pointed out above, switch 105 will close in response to a predetermined pressure in conduit 75. When switch 105 closes, a circuit is completed through relay coil 150 and relay coil 151. Relay coil 150 is associated with a time delay switch. Relay coil 151 upon energization, immediately completes a circuit through solenoid coil 94 as it pulls its associated switch upward as viewed in FIGURE 2. Eventually, the time delay relay completes a circuit through coil 134 causing inlet valve 24 to move to a closed position. The sequential operation described assures the opening of the dump valve 30 in advance of the closing of the inlet valve or suction damper 24. Thus, the system is vented of high pressure air and the possibility of reverse flow that might occur in the event both valves were closed simultaneously, is avoided.

Considering the operation of the control system under base load operation, it will be apparent that upon start up air will flow through line 22 to the suction inlet of the compressor and will be discharged to the reservoir. The mechanism regulating the various control elements is designed so that upon start up, the suction damper or inlet valve 24 is closed and dump valve 30 controlling the venting of the apparatus to the atmosphere is open. Manual control 129 permits air to be applied to the member 126 so that the positioning described above will obtain. Valves 87 and 89 when closed preclude air pressure being supplied to bellows 98. After the machine has attained predetermined speed, either valve 87 or 89 will be opened depending on the operating requirement of the machine. Air pressure is fed to the various conduits 36, 64, 75 and 116. As the temperature of the air flowing in the suction conduit 22 increases, bellows 44 expands to restrict leakage of air through the orifice associated with valve 46. During the rise in temperature reflected by the increase in branch conduit 50 to a sum of approximately 12 p.s.i., the portion of the control system illustrated by branch line 50 regulates movement of the suction damper 24 in the manner described above. On base load operation, valve 128 is open as is valve 123 associated with the totalizer relay 108. Valve 87 disposed in line 86 serving to control dump valve 30 is closed. The coil 134 positions three-way valve 132 so that air flowing in line 116 flows in parallel through lines 116' and 130 to the bellows 126. As the temperature of the incoming air to the compressor increases, valve 24 moves to an open position. Thus, the compressor is delivering an output conditioned upon the density of the air flowing through the compressor in such a manner that excessive current draw by an electric motor driving the compressor is avoided. Should the volume of flow be such that the pressure at the inlet of the machine rises, the control is operable to cause the suction damper to move to a closed position.

Subsequently, the air temperature may increase so that the pressure in branch line 48 exceeds 13 p.s.i. Under these circumstances, that portion of the control regulating the dump valve 30 will come into operation. So long as the inlet air temperature maintains predetermined relationship with the discharge pressure, a signal of a given magnitude will be supplied through lines 75 to the bellows 98 controlling the dump valve 30. This is true because valve 71 is open and valve 73' is closed An increase in discharge pressure beyond a particular limit, as determined by the inlet air temperature, will cause the air pressure in supply conduit 75 to drop causing valve 30 to open and venting the discharge side of the equipment. In addition, the surge control continuously senses discharge pressure pulsations so as to prevent surging of the machine in the manner described above.

When it is desired to utilize an air compressor equipped with the control described for use on an intermittent basis, it is merely necessary to close valves 71, 89, 90 and 128 and open valves 73' and 87. Under these circumstances, the pressure employed in bellows 98 reflects directly a predetermined relationship between the inlet temperature and the reservoir pressure. It will, of course, be appreciated that a machine operating on an intermittent basis likewise draws ambient air through its suction inlet. Its discharge is connected so as to feed the reservoir 28 preferably upstream of the check valve 27. With the intermittent machine responsive directly to the reservoir pressure-air inlet temperature relationship, control of solenoid coil 94 is under the influence of pressure in line 102 serving bellows 104 so that upon satisfaction of the apparatus requirement, switch 105 will close causing the dump valve and inlet valve associated with the machine to close in sequence as described above. Further operation of the air compression plant incorporating both a base load machine and intermittent machine will be under the control of the base load machine.

It will thus be seen that the control system described may be employed to satisfy a base load requirement or an intermittent requirement. In either event, the machine, because of the mechanism reflecting the inlet air temperature-inlet pressure relationship, will operate on a controlled weight flow basis resulting in economy in the use of power required to drive the compressor. When base operation is required, the control may be operated so that a particular relationship between the inlet air temperature and the discharge pressure may be observed. This permits operation within the stable operating range of the machine at relatively high efficiency (just inside the surge point). In the event it is desired to utilize the control with a machine for satisfying an intermittent loading, the revisions described above are made so that the machine will respond to a relationship between the reservoir pressure and the inlet air temperature.

While I have described a preferred embodiment of the invention, it will be understood that the invention may be otherwise embodied within the scope of the following claims.

I claim:

1. A control system for regulating operation of a gas compression plant including a gas compressor, an inlet conduit, valve means governing flow of gas through the inlet conduit to the compressor, a reservoir for storage of gas delivered by the compressor, discharge means connecting the compressor and the reservoir, check valve means preventing flow of air from the reservoir to the compressor, and dump valve means for venting the discharge of the compressor to the atmosphere comprising: means for sensing the temperature of the gas flowing to the compressor and for transmitting a first signal related to said temperature; selectively operable means for sensing the pressure of the gas being discharged from the compressor or for sensing the pressure of the gas in the reservoir and for transmitting a second signal related to said pressure; means for receiving a first signal of a predetermined magnitude and the second signal and transmitting a resultant control signal; means responsive to said resultant signal for regulating the dump valve means governing flow of gas from the compressor in accordance with a predetermined inlet gas temperature-discharge gas pressure relationship or inlet gas-reservoir gas pressure relationship; means for sensing the pressure of the gas flowing to the compressor and for transmitting a third signal related thereto; means for receiving said first and third signals and for transmitting a resultant signal related thereto; means responsive to said last-mentioned resultant signal for regulating the valve means governing flow of gas to the compressor in accordance with a predetermined inlet gas temperature-inlet gas pressure relationship.

2. A control system as described in claim 1 including selectively operable means in parallel with said last-mentioned resultant signal for controlling the valve means governing flow of gas to the compressor.

3. A control system as described in claim 2 including second selectively operable means in parallel with said first mentioned resultant signal for controlling the dump valve means.

4. A control system as described in claim 3 wherein the means, operable in response to resultant signals are arranged to act in a predetermined sequence.

5. A control system as described in claim 1 including surge detection means operable to actuate said dump valve.

6. A control system as described in claim 4 wherein said surge detection means is operable responsive to a predetermined rate of change in the pressure of the gas flowing from the compressor.

7. A control system for gas compression apparatus including a gas compressor, a suction conduit providing a path of flow of gas to the compressor, means for receiving gas flowing from the compressor, means for discharging gas flowing from the compressor to a location other than normally intended, first valve means controlling gas flow from said gas discharge means, and second valve means regulating flow in said suction conduit comprising:

means for sensing the temperature of the gas flowing to the compressor and for producing a first signal related to said temperature; means for sensing the pressure of the gas flowing to the compressor and for transmitting a second signal related thereto; means for receiving said first and second signals and for transmitting a resultant signal related thereto; means responsive to said resultant signal for regulating the valve means governing flow of gas to the compressor in accordance with a predetermined inlet gas temperature-inlet gas pressure relationship; means for selectively sensing the pressure of the gas being discharged from the compressor and means for receiving the gas flowing from the compressor and for transmitting a third signal related to said pressure; means for receiving a first signal of a predetermined magnitude and the third signals and transmitting a resultant control signal; means responsive to said last-mentioned resultant signal for regulating the dump valve means governing flow of gas from the compressor in accordance with a predetermined inlet gas temperature-discharge gas pressure relationship.

8. The method of regulating the operation of a gas compressor having an inlet conduit through which gas to be compressed is supplied to the compressor, an inlet valve in the conduit controlling the flow of gas to the compressor, compressed gas storage means, a discharge conduit connecting the outlet of the compressor with the compressed gas storage means, means including a dump valve arranged between said compressor outlet and the storage means for selectively communicating the compressor outlet with the atmosphere to relieve pressure at the discharge side of the compressor which consists in the steps of continually sensing the pressure of the gas within the compressed gas storage means and in response to a predetermined pressure of the gas within the storage means actuating the dump valve to establish communication between the discharge side of the compressor and the atmosphere and thus reduce pressure in the discharge side of the compressor and after a predetermined time interval positioning the valve in the inlet conduit so as to offer maximum resistance to the flow of gas to the compressor.

References Cited
UNITED STATES PATENTS

| | | | |
|---|---|---|---|
| 2,142,596 | 1/1939 | Algarsson | 230—114 |
| 2,295,728 | 4/1942 | Gess | 230—4 |
| 2,339,150 | 1/1944 | Codrington | 230—114 |
| 2,353,201 | 7/1944 | Talbot | 230—114 X |
| 2,490,188 | 12/1949 | Ziebolz | 230—115 |
| 2,661,145 | 12/1953 | Heineman | 230—22 |
| 2,950,857 | 8/1960 | William et al. | 230—114 |
| 3,076,593 | 2/1963 | Newton | 230—25 |
| 3,119,552 | 1/1964 | Thomann | 230—114 |

DONLEY J. STOCKING, *Primary Examiner.*

W. L. FREEH, *Assistant Examiner.*